(12) United States Patent
Oding et al.

(10) Patent No.: US 12,135,264 B2
(45) Date of Patent: Nov. 5, 2024

(54) THERMOPLASTIC MOUNTING MEDIUM AND A METHOD OF ITS MANUFACTURE

(71) Applicant: Struers ApS, Ballerup (DK)

(72) Inventors: Per Buus Oding, Fredensborg (DK); Sune Demuth Dano, Bagsvaerd (DK); Tine Hjersing Sparre, Jyllinge (DK); Estella Levy Jessen, Vaerlose (DK)

(73) Assignee: Struers ApS, Ballerup (DK)

( * ) Notice: Subject to any disclaimer, the term of this patent is extended or adjusted under 35 U.S.C. 154(b) by 1518 days.

(21) Appl. No.: 16/339,833

(22) PCT Filed: Oct. 6, 2016

(86) PCT No.: PCT/EP2016/073871
§ 371 (c)(1),
(2) Date: Apr. 5, 2019

(87) PCT Pub. No.: WO2018/065055
PCT Pub. Date: Apr. 12, 2018

(65) Prior Publication Data
US 2019/0293528 A1 Sep. 26, 2019

(51) Int. Cl.
| | |
|---|---|
| *G01N 1/36* | (2006.01) |
| *B29C 48/00* | (2019.01) |
| *B29K 23/00* | (2006.01) |
| *B29K 509/02* | (2006.01) |
| *B29K 511/14* | (2006.01) |
| *C08J 5/04* | (2006.01) |
| *C08L 23/12* | (2006.01) |
| *C08L 97/00* | (2006.01) |
| *C08L 97/02* | (2006.01) |
| *G01N 1/30* | (2006.01) |

(52) U.S. Cl.
CPC ............ *G01N 1/36* (2013.01); *C08L 23/12* (2013.01); *C08L 97/00* (2013.01); *C08L 97/02* (2013.01); *G01N 1/30* (2013.01); *B29C 48/0022* (2019.02); *B29K 2023/12* (2013.01); *B29K 2509/02* (2013.01); *B29K 2511/14* (2013.01); *B29K 2995/0013* (2013.01); *C08J 5/045* (2013.01); *C08L 2201/08* (2013.01); *C08L 2205/16* (2013.01); *C08L 2207/04* (2013.01); *G01N 2001/305* (2013.01); *G01N 2001/364* (2013.01); *G01N 2001/366* (2013.01)

(58) Field of Classification Search
None
See application file for complete search history.

(56) References Cited

U.S. PATENT DOCUMENTS

| | | | |
|---|---|---|---|
| 3,268,644 A | 8/1966 | Cain et al. | |
| 7,829,183 B2 | 11/2010 | Forrest et al. | |
| 2004/0028563 A1 | 2/2004 | Cunningham | |
| 2009/0286075 A1 | 11/2009 | Nakamura et al. | |
| 2012/0146255 A1* | 6/2012 | Maschke | A61K 9/1694 264/210.1 |
| 2016/0108187 A1 | 4/2016 | Wendeln et al. | |

FOREIGN PATENT DOCUMENTS

| | | |
|---|---|---|
| CN | 101353564 A | 1/2009 |
| CN | 101415779 A | 4/2009 |
| CN | 101541876 A | 9/2009 |
| CN | 101747584 A | 6/2010 |
| CN | 101903306 A | 12/2010 |
| CN | 102504485 A | 6/2012 |
| CN | 102507400 A | 6/2012 |
| CN | 103270099 A | 8/2013 |
| CN | 103814082 A | 5/2014 |
| JP | 56-070445 | 6/1981 |
| JP | 5-26794 | 2/1993 |
| JP | H1054942 A | 2/1998 |
| JP | 5026794 B2 | 9/2012 |
| TW | 201312046 A | 3/2013 |
| WO | 2007/116973 A1 | 10/2007 |
| WO | 2008/106631 A1 | 9/2008 |
| WO | 2013/040289 A2 | 3/2013 |
| WO | 2013/069365 A1 | 5/2013 |
| WO | WO 2015/193533 | * 12/2015 |

OTHER PUBLICATIONS

PCT International Search Report and Written Opinion issued for the corresponding international application No. PCT/EP2016/073871 mailed Jul. 17, 2017, 10 pages.

* cited by examiner

*Primary Examiner* — Robert T Butcher
(74) *Attorney, Agent, or Firm* — Snyder, Clark, Lesch & Chung, LLP

(57) ABSTRACT

A thermoplastic mounting medium (25) configured for embedding and subsequently fixating a sample material (10) in a moulding cavity (11) by means of sintering or melting the thermoplastic mounting medium (25) to become a monolithic bulk material at least partially accommodating said sample material (10) The thermoplastic mounting medium (25) includes a mixture of: polymer mixed with organic fibres, and thermally conductive filler having a thermal conductivity of minimum 5 W/(m×K) wherein the thermally conductive filler is mixed homogeneously with the composite material and wherein that the thermally conductive filler represents at least 30% w. of the thermoplastic mounting medium.

18 Claims, 4 Drawing Sheets

THERMOPLASTIC MOUNTING MEDIUM AND A METHOD OF ITS MANUFACTURE

The present invention relates, according to a first aspect, to a thermoplastic mounting medium configured for embedding and subsequently fixating a sample material in a moulding cavity by means of sintering or melting said thermoplastic mounting medium to become a monolithic bulk material at least partially accommodating the sample material.

According to a second aspect, the present invention relates to a method of manufacturing a thermoplastic mounting medium.

A thermoplastic, or thermosoftening plastic, is a plastic material, or a polymer, that becomes pliable or mouldable above a specific temperature and solidifies upon cooling.

The term "sintering" throughout this specification refers to a process of compacting and/or forming a solid mass from pelletized/granular material by applying heat and/or pressure without melting it to the point of complete liquefaction. Sintering typically cause a pelletized/granular material to become a monolithic bulk material by melting the interface between individual pellets/granular particles.

BACKGROUND

Preparing sample materials such as materialographic and/or metallographic samples for analysis such as for microscopy or SEM for hardness testing or image analysis, is a challenging and often time consuming task; inter alia as each sample must be fixed by moulding in an often modular sample holder in order to facilitate not only the analysis of the sample material, but also the preparation of the sample material for the analysis.

Preparation for analysis includes various steps of cutting and polishing the sample material in order to present a perfect surface of the sample material.

In order to fix a sample material in a sample holder, or with respect to a sample holder, the sample material typically is embedded in a mounting medium prior to preparation and subsequent analysis. By this, protection as well as easy handling of the often small and fragile samples are obtained.

The availability of sophisticated sample material embedding systems and/or sample mounting systems has made the process of embedding the samples easier. The sample mounting process is, however, and despite the sophisticated techniques, still a demanding and time consuming operation; especially since many embedding systems rely on powder based embedding media which may become airborne during handling and thereby pose a risk of the operator inhaling materials which are harmful to the health if the operator.

Prior art holds various attempts to mitigate the above drawbacks of today's sample material embedding systems. Some of the attempts include provision embedding materials provided as relatively large particles; thus preventing the material from becoming airborne during handling. Other attempts include provision embedding materials comprising natural fillers such as wooden or plant based fillers. These attempts suffer inter alia from the below limitations:

a) the mounting medium's ability to transfer heat into and out from the embedding matrix, and b) some mounting media's ability to withstand the applied temperatures without sticking to, or burning onto, the surfaces of the mould thereby preventing easy, clean and complete extraction of the mounted sample from the mould.

The limitation a) in theory could be solved by applying either very high or very low temperatures to the mould in order to heat or cool the mounting medium. This, however, is undesirable inter alia as:

very high temperatures may cause the mounting media to stick, or burn on, to the mould as per b) above large temperature gradients through the contents of the mould in effect compromise the integrity of the mounting medium, and large temperature gradients cause the mounting medium to sinter or melt with a less than optimal or suitable rate to produce a homogeneous of the matrix within reasonable cycle times.

The solution to limitation b) is, contrary to the solution proposed under a) to reduce the applied heat load to the mould during the sintering process—which obviously will prolong the mounting process.

Sticking, or burn on, of the mounting medium to the mould typically occurs when certain constituents of the mounting medium is heated beyond a certain threshold and/or beyond a certain period of time.

When the mounting medium contains organic products such as wood and/or plants fibres etc., it has been found that lignin may be released from the products thereby, in effect, gluing the sintered or melted mounting medium to the mould.

Lignin is an adhesive and a class of complex organic polymers that form important structural materials in the support tissues of organic products such as wood and plants etc. Lignin may be extracted from plant fibres chemically and/or means of condensation; the latter is considered to be a cause of the limitation mentioned under b) above; together with the fact that some materials inevitable will burn on to surfaces when the materials are exposed to temperatures above certain thresholds.

Furthermore, it has been found that, when the mounting medium contains organic products such as wood and/or plants fibres etc., cellulose may be released from the products thereby, in effect, also gluing the sintered or melted mounting medium to the mould as a result of cellulose acting as a mild glue.

When the sample material is finally mounted in the mounting medium, the sample material preparation process further includes following steps:

sectioning the sample into one or more suitable sections, mounting the sectioned sample material in a mounting medium to facilitate handling and to protect the sample material, grinding the mounted sample, and polishing the mounted sample.

The embedding material, or the mounting medium, must be composed or chosen such that the mounting medium offers satisfactory properties with respect to working environment, i.e. it must be safe to work with and preferably not prone to become airborne as dust during handling.

Furthermore, the embedding material, or the mounting medium, must be composed or chosen such that the mounting medium offers satisfactory properties with respect to fixation and edge retention of the sample material within the mounting medium.

Typically, the sample material is embedded in the mounting medium by means of a sintering or melting process taking place in a compression mould.

Below are listed two exemplary mounting processes; a "normal mode" and a "sensitive mode".

The "normal mode" mounting process typically is applied for non-sensitive mounting media which will not stick, or burn on, to the mould.

In case the sample material is mounted by means of a sensitive mounting medium, such as a wood-plastic composite, or WPC, which is known to stick, or burn on, to the mould, a "sensitive mode" process is applied.

The "normal mode" process typically is configured as a two-step process:
1. 3, 5 minutes heating at 180° C., pressure 250 bar from ram
2. 2 minutes cooling, pressure 250 bar from ram The "sensitive mode" process typically is configured as a three-step process:
1. X1 minutes heating and without pressure from ram
2. X2 minutes heating, reduced pressure from ram
3. X3 minutes cooling, reduced pressure from ram As can be derived from the above "sensitive mode" process, the mounting medium is initially heated without applying pressure as it has been found that the combination of heat and pressure in an initial step, as per "normal mode", may cause prior art WPC-based mounting media to stick, or burn on, to the mould and ram. The initial heating process of the "sensitive mode" is considered to allow the polymer of the WPC-based mounting medium to embrace the wooden fibres thereby protecting the temperature sensitive fibres from heat.

Once the mounting medium is heated, a reduced pressure is applied to allow the resin to sinter. Finally, the mounting medium is cooled under reduced pressure.

The objects of the present invention inter alia are:
to set forth a non-reactive, thermoplastic mounting medium which is safe to handle,
to set forth a dust-free thermoplastic mounting medium which is safe,
to set forth a thermoplastic mounting medium which is easy to remove from a mould when the mounting process is complete,
to set forth a thermoplastic mounting medium which may be removed from a mould without leaving residual mounting medium on the surfaces of the mould and/or the ram, and
to set forth a thermoplastic mounting medium which is cost efficient and safe to handle.

Moreover, it is an object of the present invention to set forth a method of manufacturing a thermoplastic mounting medium.

U.S. Pat. No. 3,268,644 A discloses a method of making an assembly including a specimen holder and a specimen for the purpose of subjecting the specimen to etching by means of an electric discharge. The object of the invention according to U.S. Pat. No. 3,268,644 A is to provide a method of making a specimen assembly which exposes only a small part of the surface of the specimen to an electric discharge and to provide effective means for impressing electrical potential to the embedded specimen. The method includes placing the specimen in a block of mouldable electrically conducting material consisting of a mixture of two parts phenolic condensation powder (Bakelite) with a mica filler and/or wood flour filler or the like and one part aluminium filler. This recipe thus results in a powder having 66.6% non-metal and 33.3% metal. According to the reference, the said non-metal/metal ratio allows for electrical potential to be impressed between the specimen and an anode. The mixture according to U.S. Pat. No. 3,268,644 A is chemically cured under a heat-treatment process. The reference provides no teaching with respect to any of:

limiting gaps between the hardened/cured powder and the specimen,
the heat conductivity of the said hardened powder,
the workability of the hardened powder,
hardening by means of a sintering process,
chemical compatibility with the sample during subsequent materialographic and/or metallographic preparation steps, or
avoid interference with energy-dispersive X-ray spectroscopy spectra of typical metallographic samples.

US 2016/108187 A discloses a wood/fibre polymer composite in the form of a biomaterial product based on sunflower seed shells or sunflower seed hulls.

JP 5026794 A discloses a non-metallic resin for embedding sample materials prior to preparation and analysis.

US 2004 028563 A discloses a tool for making a mounting or holder for a tablet-shaped sample material which is to undergo analysis in/by an analytical instrument.

JP 56070445 A discloses an electroconductive mounting medium comprising electroconductive powder such as carbon powder of 10-30% w. or aluminium powder of 30-60% w. or copper powder 30-60% w. The electroconductive powder is mixed in phenolic resin in an undisclosed % w. ratio and heat and pressure are applied to the mixture for moulding and thus the electroconductive resin for embedding the analytical sample is prepared without necessity to apply electroconductive coating after moulding.

CN 102504485 A discloses a conductive and chemically hardening resin suitable for SEM (scanning electron microscope) observation.

U.S. Pat. No. 3,268,644 A discloses a method of producing an assembly for subjecting a specimen to etching and polishing and the like. The method includes the steps of placing a hollow uncured thermosetting insulator over a portion of the external surface of an uncured premould of thermosetting mouldable electrically conducting material. A first portion of said external surface being exposed and having said insulator means adjacent thereto and a second portion of said external surface being also exposed. Placing said specimen with one of its faces in engagement with said adjacent insulator means and said first portion of said surface and compressing said premould insulator means and specimen together, while curing said premould and insulator means until said specimen is embedded in said premould with the face of said specimen substantially flush with the adjacent surface of said insulator means and with said second portion of said external surface of said premould remaining exposed.

Moreover, there are today a number of hot mounting materials available from various suppliers. An example of such supplier is Cloeren Technology GmbH who is offering thermoplastic hot mounting materials of the shelf made from natural fibre-reinforced compounds based on polymers such as polypropylene but without heat conductive elements.

BRIEF DESCRIPTION OF THE INVENTION

The present invention seeks in general to set forth a thermoplastic mounting medium with is safe to handle and which will not stick to the mould or ram following the embedding process of the sample material.

In accordance with aspects as mentioned above, the objects of the present invention are met by means of the thermoplastic mounting medium as per the introductory part of this specification wherein thermoplastic mounting medium includes a mixture of:
polymer mixed with organic fibres, and thermally conductive filler having a thermal conductivity of minimum 5 W/(m×K)
and wherein the thermally conductive filler is mixed homogeneously with the composite material and wherein that the thermally conductive filler represents at least 25% w. of the thermoplastic mounting medium.

In some embodiments, the thermally conductive filler having a thermal conductivity of at least 10, 30, 100 or 200 W/(m×K) according to the desired characteristic of the a thermoplastic mounting medium.

Thermal conductivity is a measure of the ability of a material to allow conductance or flow of heat from a warmer surface through the material to a colder surface. Thermal conductivity may be determined as the heat energy transferred per unit of time and per unit of surface area divided by a temperature gradient.

The polymer mixed with organic fibres may constitute readily available wood-plastic composites, or WPC. WPC is usually used to designate materials or products made of one or more natural fibres or flours and a polymer or a mixture of polymers.

Natural or organic fibres and flours may come from different vegetable sources such as from wood, hemp, sisal, jute, kenaf, rice, coconut, flax, almond, bamboo, grass etc. The present invention is not in any way limited the type or origin of the organic fibres.

The effect of adding a thermally conductive filler to the thermoplastic mounting medium inter alia is lessened temperature gradients during heating in the boundary or interface between the mould or ram and the mounting medium residing within the mould which, in turn and as per the above, prevents the mounting medium from sticking, or burning on, to the mould and/or ram. Moreover, the temperature gradients are lessened throughout the mounting medium during heating thereby allowing the matrix to melt or sinter uniformly Conclusively, the addition of a thermally conductive filler mitigates the limitations under a) as well as under b) as presented above.

Increased heat conductivity, following the presence of the thermally conductive filler, of the mounting medium also may reduce the time required for mounting the sample material as the time required for uniformly heating and possibly cooling the batch to a certain temperature is reduced. Moreover, the applied heat load at interfaces may be lessened significantly thereby preventing extensive release of lignin and/or cellulose from the organic constituents as well as burn on to the mould and ram.

According to one embodiment, the thermally conductive filler may have a thermal conductivity of at least 2 times the thermal conductivity of the polymer mixed with organic fibres. By this, increased heat conductivity of the thermoplastic mounting medium is obtained.

According to one embodiment, the polymer may be mixed with the organic fibres in a % w. ratio of 50% +/−10% organic fibres and 50% +/−10% polymer.

According to one embodiment, the thermoplastic mounting medium may constitute a WPC or a WPC sub product which, in a molten state, is mixed with a filler having a thermal conductivity which is higher than the thermal conductivity of the WPC.

According to one embodiment, the organic fibres may constitute wood or plant fibres.

According to one embodiment, the polymer may constitute polypropylene or a polypropylene homopolymer.

According to one embodiment, the thermoplastic mounting medium may be provided as pellets having a particle size of abt. 1×1 mm.

According to one embodiment, the thermally conductive filler may constitute an inorganic filler.

According to one embodiment, the polymer mixed with organic fibres, or the WPC, represents maximum 70% w. of the mounting medium.

According to one embodiment, the weight % ratio between the polymer mixed with organic fibres, or the WPC, and the thermally conductive filler is 25-50% thermally conductive filler and 75-50% polymer mixed with organic fibres or 30-45% thermally conductive filler and 70-55% polymer mixed with organic fibres or 40% thermally conductive filler and 60% polymer mixed with organic fibres.

According to one embodiment, the composition of the mounting medium may be 20-30% w. polymer, 30-50% w. thermally conductive filler and 20-50% w. organic material.

According to one embodiment, said thermally conductive filler is metal particles such as aluminium or aluminium alloy particles. The particles preferably may be provided as flakes or a powder.

According to one embodiment, the mounting medium may be configured for embedding and subsequently fixating materialographic or metallographic samples for preparation and subsequent analysis.

According to one embodiment, a sample material embedded in the thermoplastic mounting medium according to the present invention is provided.

According to the second aspect of the present invention, a method of manufacturing a thermoplastic mounting medium is provided. The method includes the step of, e.g. in a WPC production line, mixing a molten polymer with organic fibres and a thermally conductive filler. The method furthermore may include a step of, before the mixture sets, pressing the mixture through a die with a cutting knife to produce pellets having a particle size of about 1×1 mm.

DETAILED DESCRIPTION

The present invention will in the below be explained in more detail with reference to the figures.

Figure 1:
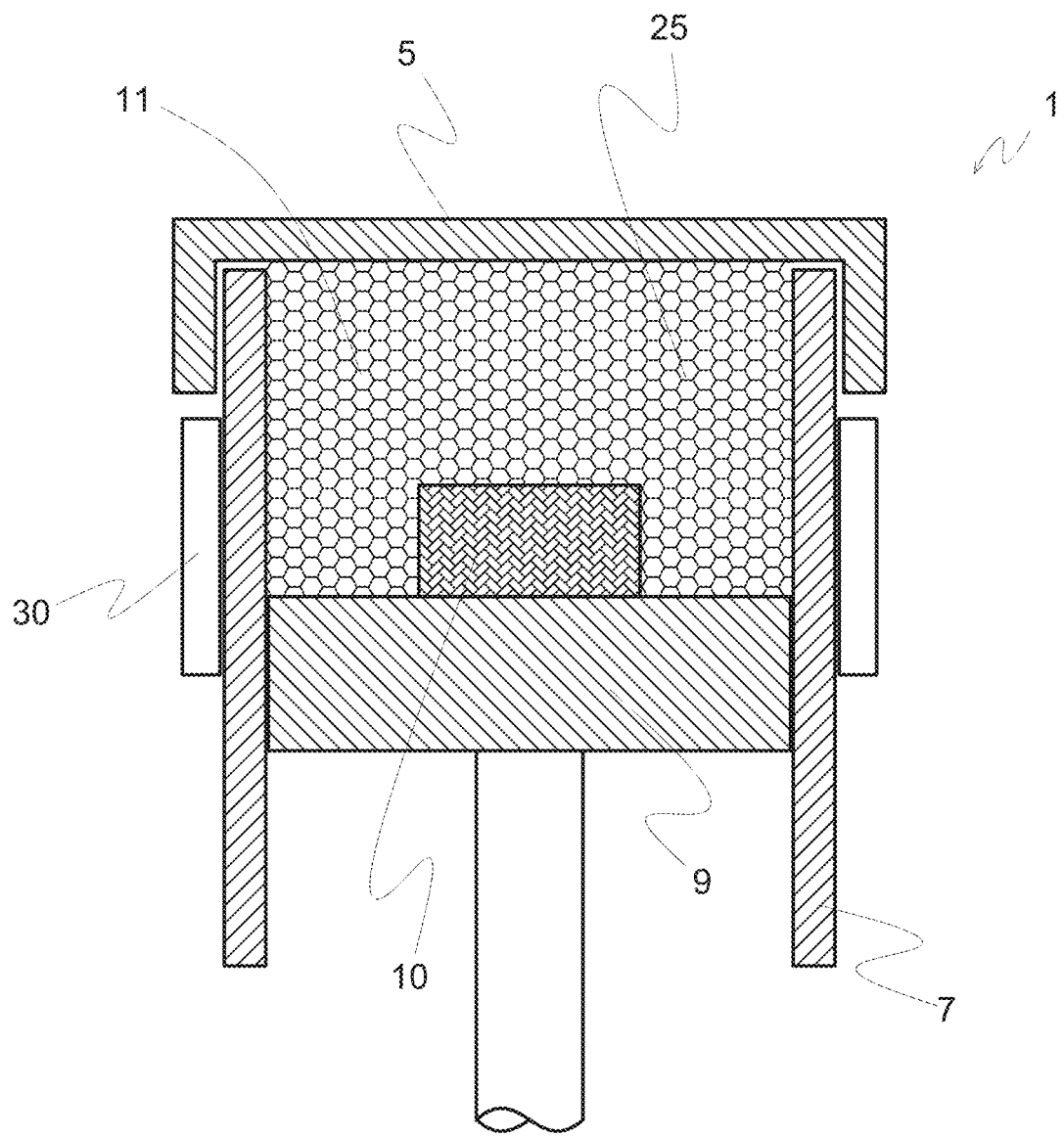
FIG. 1 shows, schematically, a sample material arranged in a compression mould.
Figure 3:
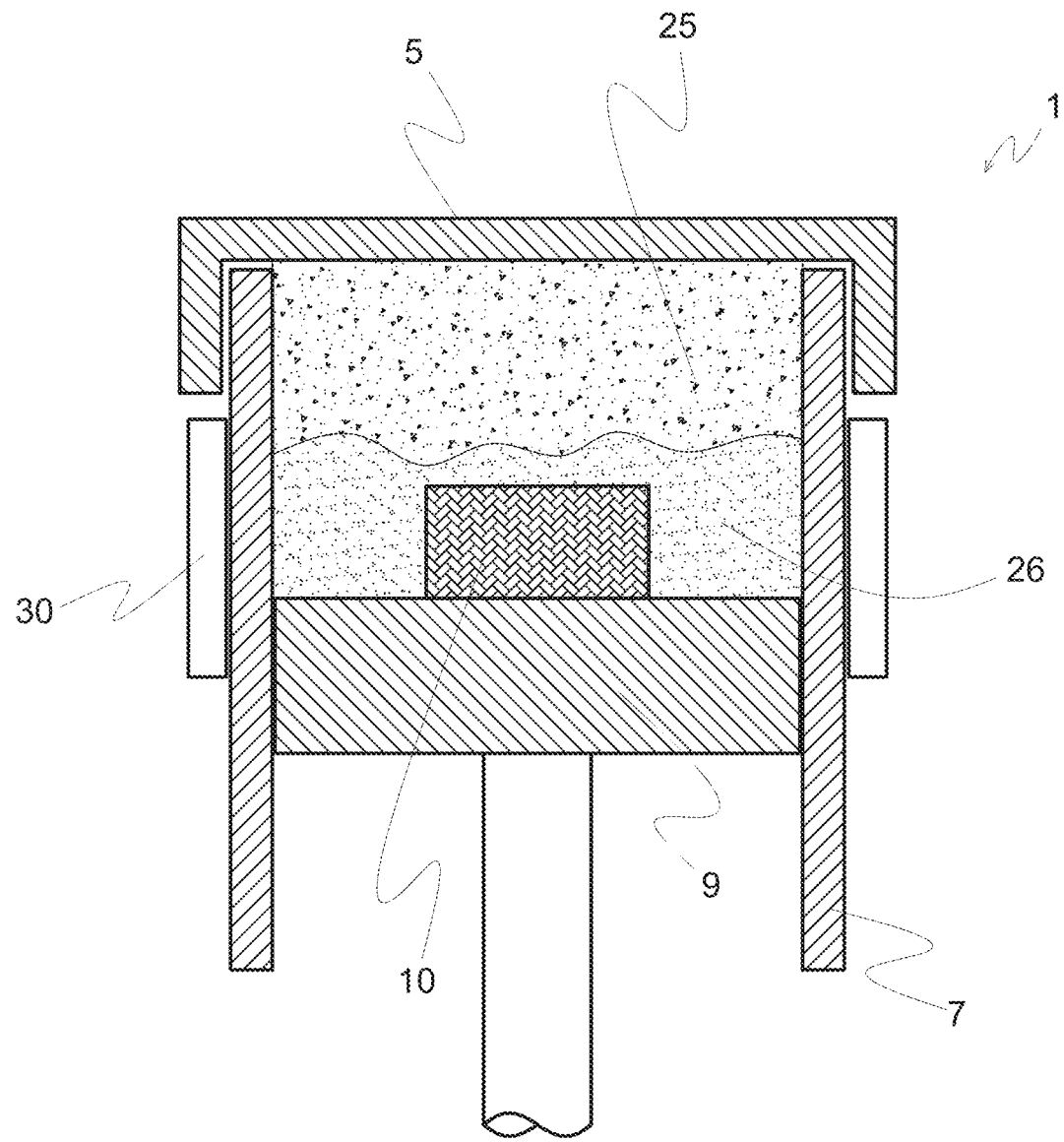
FIG. 3 shows, schematically, a sample material arranged in two different mounting media and arranged in a compression mould.

FIGS. 1 and 3 show a compression mould 1 including a lid or cover 5, walls 7 which may be embodied as a cylinder, and pressing means 9. The pressing means 9 may, as shown in FIGS. 1 and 3, be embodied as a ram. The pressing means are configured for applying pressure during the mounting process.

The walls 7, the lid 5 and the pressing means 9 together define a cavity 11 configured for receiving a sample material 10 and the mounting medium 25 in accordance with an aspect of the present invention.

Temperature regulating means 30, i.e. heating and/or cooling means 30, is in the depicted embodiments according to FIGS. 1 and 3 shown as means encircling the walls 7 or the compression mould 1.

In the embodiment according to FIG. 1, the sample material 10 initially is placed on the pressing means 9 inside the cavity 11 where after the cavity 11 is at least partially filled with pelletized mounting medium 25.

In the embodiment according to FIG. 3, the sample material 10 initially is placed on the pressing means 9 inside the cavity 11. A second mounting medium 26, pelletized or not and in accordance with the present invention or not, is then filled in the cavity 11; possibly to cover the exposed faces of the sample material 10 resting on the pressing means 9. The second mounting medium 26 may be chosen in accordance with any desired properties or frames of costs etc. for the mounting medium 26. The first mounting medium 25 in accordance with the first aspect of the present invention may, as shown, be applied as a backing.

In the embodiment according to FIG. 3, the mounting medium may, however, constitute the first mounting medium 25 only.

The cover or lid 5 may be connected to the walls of the mould 1 by means of not shown threads or equivalent.

The present invention is not in any way limited to a particular embodiment or type of mould; other types of mounting devices including alternative kinds of moulding cavities, or compression moulding cavities, may equally be applied without departing from the scope of the present invention.

FIG. 1, shows the pelletized mounting medium 25 in a unsintered state prior to application of heat and pressure as described above.

Figure 2:
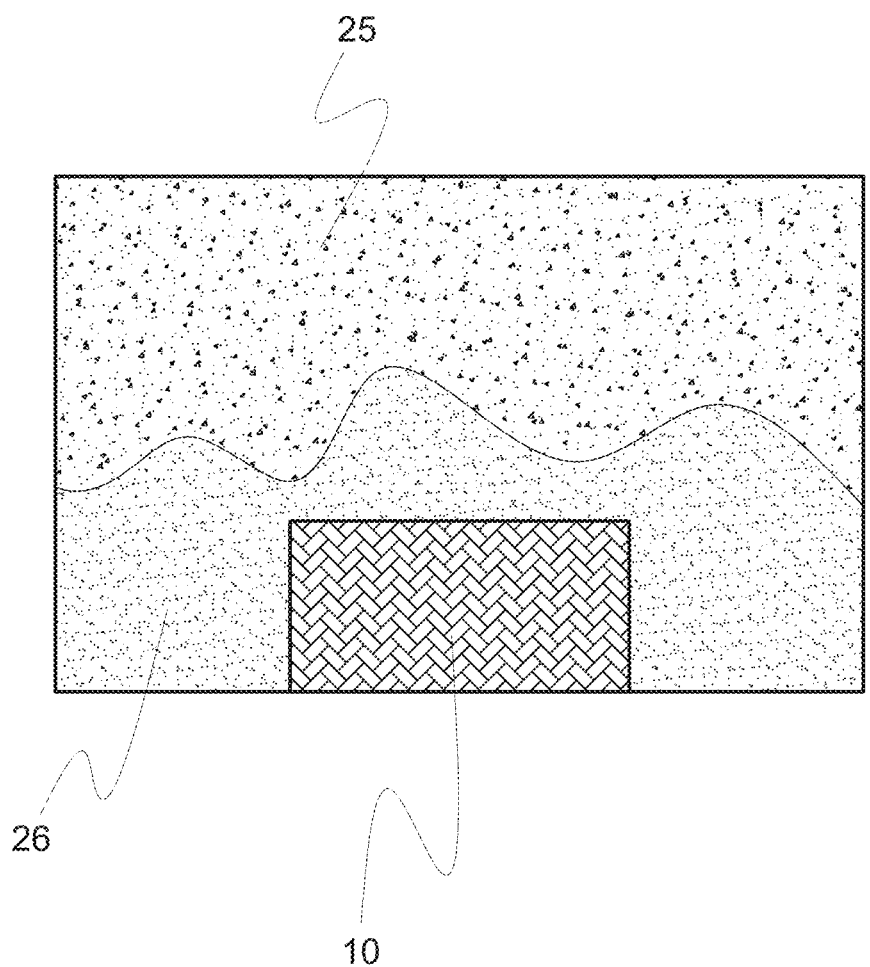
FIG. 2 shows, schematically, a sample material arranged in two different mounting media.

FIGS. 2 and 3 show the sintered mounting medium 25 in a settled state firmly embedding the sample material 10.

The ideal thermally conductive filler, metallic or not, may be chosen to have the following properties:
- The thermal conductivity of the filler should in some embodiments be as high as possible in order to secure as high heat conductance during the mounting process as possible; thereby minimizing gradients throughout the mounting medium during heating and/or cooling,
- In case electrical conveyance of the embedding medium is desired, a filler having suitable electrical properties should be chosen,
- Galvanic decomposition of the mounted sample in some applications should be avoided. This requires the filler to be galvanic inert. Alternatively, the filler material should be the sacrificial anode when combined with the typical metallic samples such as different steel types, and low placed metals or alloys in the galvanic series.
- The filler should be acceptable with regards to safety and environmental impact, Aluminium filler, or aluminium alloy/aluminium based filler, fulfils the above criteria and is therefore in many embodiments preferable compared to other metals or inorganic compounds.

The formation of oxide membrane on aluminium is, on the other hand, beneficial as the metal may be rendered passive as a result of the membrane.

Furthermore, aluminium has the benefit of being compatible with scanning electron microscopy (SEM) and Scanning electron microscopy with energy dispersive X-ray spectroscopy (SEM/EDX), which is frequently used with materialographic and/or metallographic samples.

According to other embodiments, the thermally conductive filler may constitute calcium carbonate (CaCO3). Calcium carbonate may be beneficial as this mineral filler matches the workability of hard and medium hard samples better than soft filler materials such as aluminium.

According to other embodiments, the thermally conductive filler may constitute titanium dioxide (TiO2). Titanium dioxide may be beneficial as this mineral filler allows matches the workability of hard and medium hard samples better than soft filler materials such as aluminium.

FIG. 2 shows, schematically, an embodiment of the present invention wherein a sample material 10 is arranged in two different mounting media; a first backing mounting medium 25 according to the present invention and a second mounting medium 26. The second mounting medium 26 may be chosen in accordance with any desired properties or frames of costs for the mounting medium 26. The embodiment is particular beneficial in case the mounting medium 25 according to the present invention is undesirable as the sole mounting medium, e.g. in case the mounting medium 25 is too soft compared to the sample material 10 leading to rounding of the sample edges during the subsequent preparation steps. Moreover, in case the filer according to the present invention disturbs the process of preparing the sample 10 for examination, it may be desirable to apply the embodiment according to FIG. 2.

When the sample is properly mounted in the mounting medium, the sample is ready for mechanical preparation and subsequent microscopic analysis or equivalent.

Figure 4:
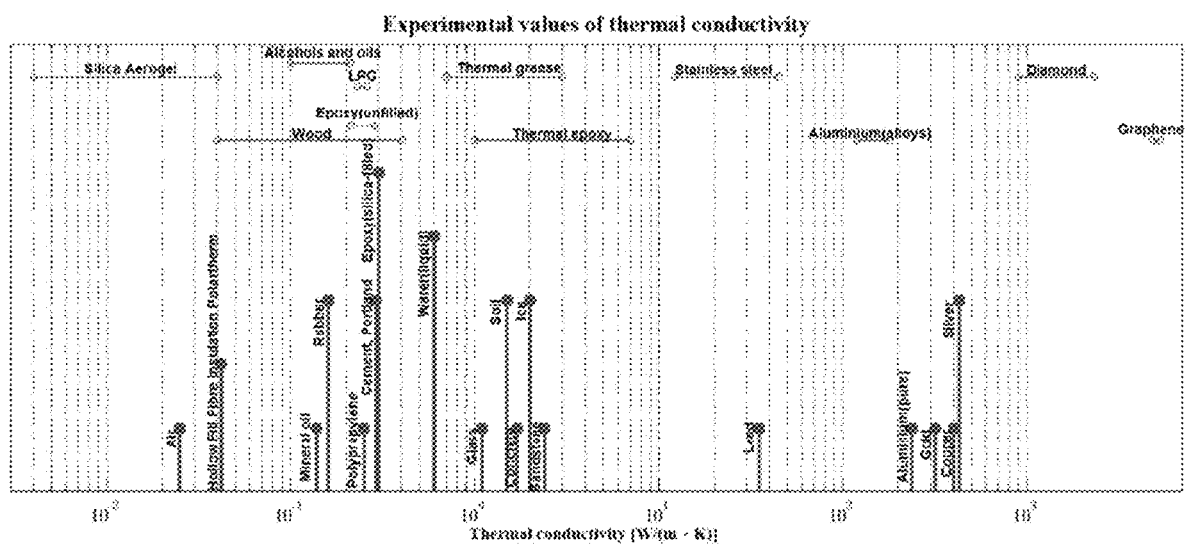
FIG. 4 shows values of thermal conductivity in the SI unit W/(m×K) for various materials.

FIG. 4 shows values of thermal conductivity in the SI unit $W/(m \times K)$ for various materials. As can be seen, the thermal conductivity of aluminium, or aluminium alloys, is in the range of 1-300 $W/(m \times K)$ whereas the thermal conductivity of polypropylene and wood is substantially less; i.e. in the region of 0.1 $W/(m \times K)$.

The present invention is not in any way limited to one or more of the illustrated embodiments. Features of one embodiment may be combined with, or replaced by, features of another, possibly not shown, embodiment without departing from the scope of the present invention.

The invention claimed is:

1. A method of using a thermoplastic mounting medium for embedding and subsequently fixating a sample material in a moulding cavity, wherein said thermoplastic mounting medium includes:
   a composite material comprising a polymer mixed with organic fibres, and
   a thermally conductive filler having a thermal conductivity of a minimum 5 $W/(m \times K)$ and wherein said thermally conductive filler represents at least 30% by weight of said thermoplastic mounting medium,
   wherein said polymer is mixed with said organic fibres in a % weight ratio of at least 20% polymer, 20-50% organic fibres and 30-50% thermally conductive filler,
   the method comprising:
   mixing the composite material and the thermally conductive filler; and
   sintering or melting the thermoplastic mounting medium to become a monolithic bulk material at least partially accommodating the sample material.

2. The method according to claim 1, wherein said thermally conductive filler has a thermal conductivity of at least two times the thermal conductivity of said polymer mixed with organic fibres.

3. The method according to claim 1, wherein said organic fibres constitute wood or plant fibres.

4. The method according to claim 1, wherein said polymer constitutes polypropylene or a polypropylene homopolymer.

5. The method according to claim 1, wherein said thermoplastic mounting medium is provided as pellets having a particle size of about 1×1 mm.

6. The method according to claim 1, wherein said thermally conductive filler is an inorganic filler.

7. The method according to claim 1, wherein said polymer mixed with organic fibres represent a maximum 70% by weight of said mounting medium.

8. The method according to claim 1, wherein the weight % ratio between said polymer mixed with organic fibres and said thermally conductive filler is 30-50% thermally conductive filler and 50-70% polymer mixed with organic fibres, 35-45% thermally conductive filler and 55-65% polymer mixed with organic fibres, or 40% thermally conductive filler and 60% polymer mixed with organic fibres.

9. The method according to claim 1, wherein the composition of the mounting medium is 24% +/−5% by weight polymer, 40% +/−5% by weight thermally conductive filler and 36% +/−5% by weight organic fibres.

10. The method according to claim 1, wherein said thermally conductive filler is metal particles.

11. The method according to claim 1, wherein said thermally conductive filler is aluminum particles.

12. The method according to claim 1, further comprising:
embedding and subsequently fixating materialographic or metallographic samples for preparation and subsequent analysis.

13. The method of claim 1, wherein the thermoplastic mounting medium further comprises a sample material embedded in the thermoplastic mounting medium according to claim 1.

14. The method of claim 1, wherein the thermoplastic mounting medium further comprises a sample material embedded in two or more layers of the thermoplastic mounting medium.

15. The method according to claim 1, wherein the mixing comprises:
mixing said organic fibres and said thermally conductive filler during production in melted polymer.

16. The method according to claim 15, further comprising:
pressing the mixture through a die with a cutting knife before the mixture sets to produce pellets having a particle size of about 1×1 mm.

17. A thermoplastic mounting medium for embedding and subsequently fixating a sample material in a moulding cavity, comprising:
a composite material comprising a polymer mixed with organic fibres; and
a thermally conductive filler having a thermal conductivity of a minimum of 5 W/(m×K),
wherein the thermally conductive filler is homogeneously mixed with the composite material,
wherein the thermally conductive filler represents at least 30% by weight of the thermoplastic mounting medium,
wherein the polymer is mixed with organic fibres in a percentage weight ratio of at least 20% polymer, 20-50% organic fibres and 30-50% thermally conductive filler, and
wherein the thermoplastic mounting medium comprises a monolithic bulk material at least partially accommodating the sample material.

18. The thermoplastic mounting medium of claim 17, wherein the thermoplastic mounting medium is sintered or melted to form the monolithic bulk material.

* * * * *